US012105040B1

(12) United States Patent
Hansen et al.

(10) Patent No.: US 12,105,040 B1
(45) Date of Patent: Oct. 1, 2024

(54) LEAD DETECTION SYSTEM FOR UNDERGROUND PIPES

(71) Applicant: Electro Scan, Inc., Sacramento, CA (US)

(72) Inventors: Charles A. Hansen, Carmichael, CA (US); Sean Blottie, Fair Oaks, CA (US); Matthew Campos, Fair Oaks, CA (US); Thomas VanBergen, Sacramento, CA (US); Janine Mullinix, El Dorado Hills, CA (US); Sonja Hansen, Carmichael, CA (US); Bianca Hansen, Carmichael, CA (US); Morgan Hansen, Carmichael, CA (US); Valeri Zaharie, Post Falls, ID (US)

(73) Assignee: Electro Scan, Inc., Sacramento, CA (US)

( * ) Notice: Subject to any disclaimer, the term of this patent is extended or adjusted under 35 U.S.C. 154(b) by 33 days.

(21) Appl. No.: 17/895,239

(22) Filed: Aug. 25, 2022

(51) Int. Cl.
*G01N 27/04* (2006.01)
*G01N 27/22* (2006.01)

(52) U.S. Cl.
CPC ......... *G01N 27/041* (2013.01); *G01N 27/226* (2013.01)

(58) Field of Classification Search
CPC .................... G01N 27/041; G01N 27/226
See application file for complete search history.

(56) References Cited

U.S. PATENT DOCUMENTS

| 2013/0199272 A1* | 8/2013 | Khalifa | ................ G01M 3/005 73/40.5 A |
| 2017/0045416 A1* | 2/2017 | Hansen | ................ G01M 3/18 |
| 2018/0080847 A1* | 3/2018 | Hansen | ............... G01M 5/0025 |

* cited by examiner

*Primary Examiner* — Alvaro E Fortich
(74) *Attorney, Agent, or Firm* — Heisler & Associates

(57) ABSTRACT

A probe provides one end of an electrically conductive path with a ground stake defining a second end. The probe is supported on a tip of a cable rotatably supported by a snake, with the snake including a conductor routed toward the ground stake. A spool can optionally be located between the conductor and the ground stake. A voltage source and a current sensor are located upon said electrically conductive path. The probe is fed by action of the snake along an underground pipe to be scanned. The current sensor senses current flow between the probe within the underground pipe and the ground stake. Analysis of the current flowing in this electric circuit allows for determining if underground pipe material includes lead, based at least partially on electrical conductivity of pipe segments through which the probe passes.

15 Claims, 4 Drawing Sheets

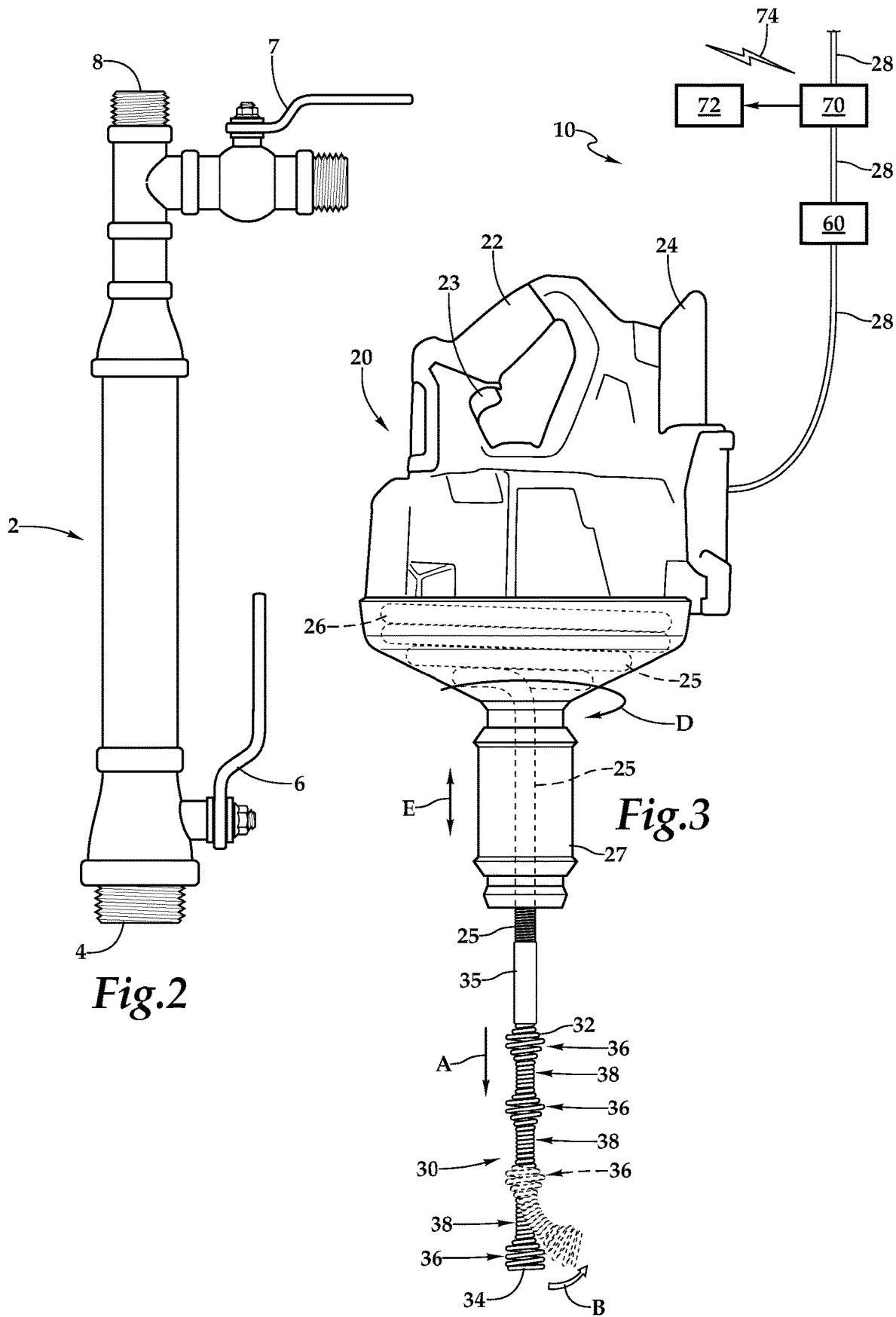

| | Electrical Resistivity at 293 K, μΩcm | Thermal Conductivity Wm⁻¹k⁻¹ | Relative Electrical Conductivity (Copper = 100) | Relative Thermal Conductivity (Copper = 100) |
|---|---|---|---|---|
| Silver | 1.63 | 419 | 104 | 106 |
| Copper | 1.694 | 397 | 100 | 100 |
| Gold | 2.2 | 316 | 77 | 80 |
| Aluminum | 2.67 | 238 | 63 | 60 |
| Beryllium | 3.3 | 194 | 51 | 49 |
| Magnesium | 4.2 | 155 | 40 | 39 |
| Tungsten | 5.4 | 174 | 31 | 44 |
| Zinc | 5.96 | 120 | 28 | 30 |
| Nickel | 6.9 | 89 | 24 | 22 |
| Iron | 10.1 | 78 | 17 | 20 |
| Platinum | 10.58 | 73 | 16 | 18 |
| Tin | 12.6 | 73 | 13 | 18 |
| Lead | 20.6 | 35 | 8.2 | 8.8 |
| Titanium | 54 | 22 | 3.1 | 5.5 |
| Bismuth | 117 | 9 | 1.4 | 2.2 |

LEAD DETECTION SYSTEM FOR UNDERGROUND PIPES

FIELD OF THE INVENTION

The following invention relates to systems for detecting lead and potentially other materials from which underground pipes (or joints) are formed. More specifically, this invention relates to lead detection systems for underground pipes which sense electrical characteristics of the pipes as at least part of pipe material detection.

BACKGROUND OF THE INVENTION

Underground pipes can be formed of a variety of different materials. Factors which go into pipe material selection include the fluids to be carried by the pipe, whether the fluids are carried under elevated pressure or not, and availability of materials near where the pipes are to be located, among other factors. Historically, materials used in forming underground pipes have differed, as technology and availability of different materials have advanced. For instance, modern supply pipes for residential housing are often formed of copper or plastic. In some instances other materials such as steel or cement or concrete are used.

In the more distant past, it has been known in at least some instances to utilize lead pipe to supply water. While lead has been known for a long period of time to be toxic, some water service lines have at least segments thereof which date back to a time before when lead was known to be toxic, or when sensitivity to use of lead in water lines was sufficiently low that some lead was still being used for pipe segments. While such old water lines typically have been replaced over time, at least some segments of underground water lines and other pipes are still in use which date back to when lead might have been used. When adjacent pipe segments were replaced, installers might have been ignorant or insensitive to the type of pipe to which they were connecting new pipe segments, missing an opportunity to identify and replace segments of lead pipe. Hence, an ongoing risk exists that lead pipe segments might still be in use for water lines and other fluid carrying lines.

Furthermore, pipe segments are joined together in a variety of different ways, with such pipe joining technologies having adapted to available technologies and materials over time. Some pipe joining techniques involve soldering, or the use of couplings which, during at least some eras, included lead as least as a component of such pipe joining technology. Hence, a potential for lead to find its way into water carried within the water line is presented by such legacy pipe joining technology.

Accordingly, a need exists to evaluate existing old water lines and other underground pipes to determine if any segments of the pipes are formed of lead or contain lead therein or at junctions thereof. While the pipes can certainly be dug up and the pipe directly tested, such a process is often quite difficult. One can envision a typical East Coast city which has perhaps half of its water lines over 100 years old. While certainly most of those water lines are not made of lead, to ensure that none of those water lines contain lead therein, the entire city's water supply infrastructure would need to be dug up and replaced. While such a process might be economical if a large percentage of the existing water lines were formed of lead, the economic cost would be the same even if no lead pipe segments at all were uncovered.

Testing an end of a water line, such as when a new water main is installed, only accounts for the material forming the water line where it joins to the water main. If the water line was previously repaired and only a portion thereof replaced, perhaps before quality records were kept, the potential exists that a portion of the water line leading into a residence from the water main might still contain at least one lead pipe segment therein.

While it is possible to line interiors of pipes, such technologies can be difficult to perform on small diameter pipes, and have negative attributes including decreasing available flow through such pipes and risk that such interior coating is not free from gaps in the coating. Furthermore, pipe lining can be most economical when focusing on pipes which are known to be made of lead or contain lead.

SUMMARY OF THE INVENTION

With this invention, a system and method are provided for detection of lead in underground pipes, utilizing an electric scanning methodology. First, a circuit is created which includes a ground stake penetrating into the ground above or otherwise near where a water line to be scanned is located. A conductive pathway is provided between this ground stake and a probe. The probe is passed within an interior of the pipe to be scanned. The conductive pathway has a voltage source placed thereon and also a current sensor. The voltage source causes a potential difference between the probe and the ground stake. This potential difference causes at least a small amount of current to pass between the probe and the ground stake, which current can be sensed by the current sensor. This circuit between the probe and the ground stake includes fluids within the pipe, the wall of the pipe, and soil between the pipe into the ground stake. The current that is sensed is thus at least partially dependent on electrical conductivity of the pipe wall. This electrical conductivity of the pipe wall can be determined by the system of this invention and then evaluated to determine whether this conductivity is indicative of the pipe wall being formed of lead.

To conveniently implement the system of this invention, it is desired in some embodiments to have the conductive pathway include a spool thereon which allows for a length of the conductive pathway to be adjusted in length to match the geometry of the field location where the underground pipe is to be scanned. The spool is of a type which maintains an electrical connection between a first conductor on one side of the spool and a second conductor on a second side of the spool. The second conductor can attach to the ground stake. The first conductor can lead toward the probe.

To further conveniently implement the system of this invention, it is desired in some embodiments to have the conductive pathway include a snake type device. This snake device includes a cable supported upon a cable spool and with an electric motor configured to rotate the cable spool. An outlet collar allows for cable to be conveniently played off of and back onto the cable spool through rotation of the spool caused by the electric motor within the housing of the snake device. The probe is attached to an end of the cable. The first conductor forming a portion of the conductive pathway maintains electrical connection to the cable. To gain access to an interior of an underground pipe to be scanned, typically some access portal such as an extension coupled into a curb stop (or valve or meter or other access point) in a service line which includes the underground pipe to be scanned, is accessed with the probe supported by the cable of the snake.

The snake or some other system monitors a distance that the probe is fed down into the service line. This distance (or time as an alternative) is correlated with current sensor data collected by the current sensor. In this way, a graph of current values versus distance along the underground pipe being evaluated, can be gathered. The data can then be analyzed to determine if it is indicative of the presence of lead within any segments of the underground pipe.

As one example, this analysis can include a step where lateral distance from the location within the underground pipe being scanned that is adjacent to the probe, and the ground stake can be at least estimated for various points along the pipe being scanned. Because the amount of soil which lies along the conductive pathway will vary depending on the position of the probe and the distance from the location of the probe to the ground stake, it is beneficial, in at least one embodiment, to normalize the current data provided by the current sensor to factor out this soil distance factor. For instance, if 80% of a voltage drop occurs within the soil when the pipe is at its closest to the ground stake, and when 90% of the voltage drop occurs within the soil when the pipe is at its greatest distance from the ground stake, 20% of the sensed current can be removed from the sensed current values which correlate with the portion of the pipe closest to the ground stake and 10% of the sensed current can be removed from the sensed current values which correlate with the portion of the pipe most distant from the ground stake, and since current values in between these extremes can be proportionally adjusted.

After such normalization procedure, the remaining current data is that portion of the current data which corresponds with the voltage drop which occurs due to the resistivity/conductivity of the material from which the underground pipe wall is formed. The voltage drop associated with water within the pipe being scanned is quite low and generally constant, and so typically does not require normalization.

The normalized current versus distance data can then be evaluated to look for anomalies and other characteristics which might be indicative of lead pipe segments. In one embodiment, one data analysis technique is to look for abrupt transitions in sensed current values. Such abrupt transitions which persist over some distance (as opposed to short distance spikes which typically represent areas of greater pipe thickness such as joints) generally represent a change in material. Often at least one material on one side of this transition is a known material. For instance, if the underground pipe is accessed from near a water main, one might directly sample or have high quality records that the access point is formed of copper. If the current values start high (indicative of copper), and then change abruptly at a transition to a lower value, an amount of this transition to the lower value can be evaluated. If it drops to an exceptionally low value, it might be indicative of a transition to plastic or other polymeric hydrocarbon material with a very low conductivity and high resistively. If it drops to an intermediate lower value, it might be indicative of lead. Conversely, if a known pipe segment that is first scanned is known to be plastic, and current values transition from a lower level to a higher level at a transition, but the transition is not a large jump in since current, it might be indicative of lead. While if a large jump is experienced, it might be indicative of a transition to copper.

In other instances, multiple segments of pipe might be formed with known material, such as a portion being formed of copper and a portion being formed of plastic. If portions of the normalized current versus distance data exhibit an intermediate sensed current reading, this can be indicative of a lead pipe segment.

Once lead is suspected as perhaps being present, locations of transitions can be mapped and holes can be dug to directly take samples of pipes in areas where lead is suspected, to confirm the presence or absence of lead. As another technique, the probe itself is preferably formed of a series of alternating tightly wound and loosely wound helical wire to both facilitate being advanced about sharp bends in small diameter pipe, and also to facilitate aggressive and abrasive engagement within interior walls of the pipe. When the probe is retracted, testing procedures, such as utilizing a lead testing kit can be conducted on the probe tip to determine if any lead was encountered by the probe tip. Lead is a soft metal that is easily scratched so that such sampling can be effective. Probe tips can either be sanitizable to remove lead from the probe after it has been sensed, or probe tips can be replaced with fresh probe tips to provide a fresh probe tip for further utilization of the system of this invention, especially after a positive test for lead.

Current sensor data is preferably transmitted, such as wirelessly, to a separate device having appropriate software for optimal normalization of the data and analysis of the data. In one embodiment, a Bluetooth connection is maintained with a smart phone or tablet computing device associated with the system of this invention. In one embodiment, the voltage source and the current sensor are both integrated into the housing of the snake and a rechargeable battery is removably attachable to the snake which supplies electric power to the electric motor of the snake and also provides electric power to the voltage source, as well as the transmitter. The housing of the snake can optionally also support a display or other read outs for direct use in the field for quick review of data. Most preferably, the data collected by the system is archived in a database which correlates the data to a geographic location, which allows for municipal operators or others to efficiently maintain an archive of data for various different locations within their jurisdiction which have been recently scanned.

OBJECTS OF THE INVENTION

Accordingly, a primary object of the present invention is to provide a system for detecting whether a segment of underground pipe contains lead or not.

Another object of the present invention is to provide a method for scanning underground pipes to determine if they contain lead.

Another object of the present invention is to use electrical conductivity of underground pipes to determine if they are formed at least partially of lead.

Another object of the present invention is to gather underground pipe electrical conductivity correlated data and to evaluate the data to determine if any segments of the pipe are formed of lead.

Another object of the present invention is to provide a system and method which can inform a user as to which portions of underground pipes warrant further investigation as to whether or not they contain lead.

Another object of the present invention is to provide a system and method which can be readily conducted in the field, whether a pipe is pressurized or non-pressurized, without requiring digging or damage to existing pipes, and determine if underground pipes are formed of lead or contain lead.

Another object of the present invention is to provide a system which is easy to set up and operate, and provides robust repeatable data as to conductivity of materials forming underground pipes, which can be correlated with material from which the pipe is made, including lead.

Another object of the present invention is to provide a system which includes a probe which can be advanced along an interior of a underground pipe and which can navigate through sharp corners and navigate through small pipe diameters, and which can work with other parts of the system to measure conductivity of walls of the underground pipe, at least indirectly.

Another option to the present invention is to provide a system which includes a probe which can be advanced along an interior of an underground pipe and which can work with other parts of a system to electrically scan the underground pipe and which can also gather a sample of the pipe by scraping interior walls of the pipe, which scrapings can be later tested for presence of lead therein.

Other further objects of the present invention will become apparent from a careful reading of the included drawing figures, the claims and detailed description of the invention.

BRIEF DESCRIPTION OF THE DRAWINGS

FIG. 2 is a front elevation view of an extension used with one embodiment of this system to gain access into the service line.

FIG. 3 is a front elevation view of a snake supporting a probe for passing into the service line for scanning of the service line underground pipe according to this invention, and also showing other portions of the overall lead detection system.

DESCRIPTION OF THE PREFERRED EMBODIMENT

Figure 1:
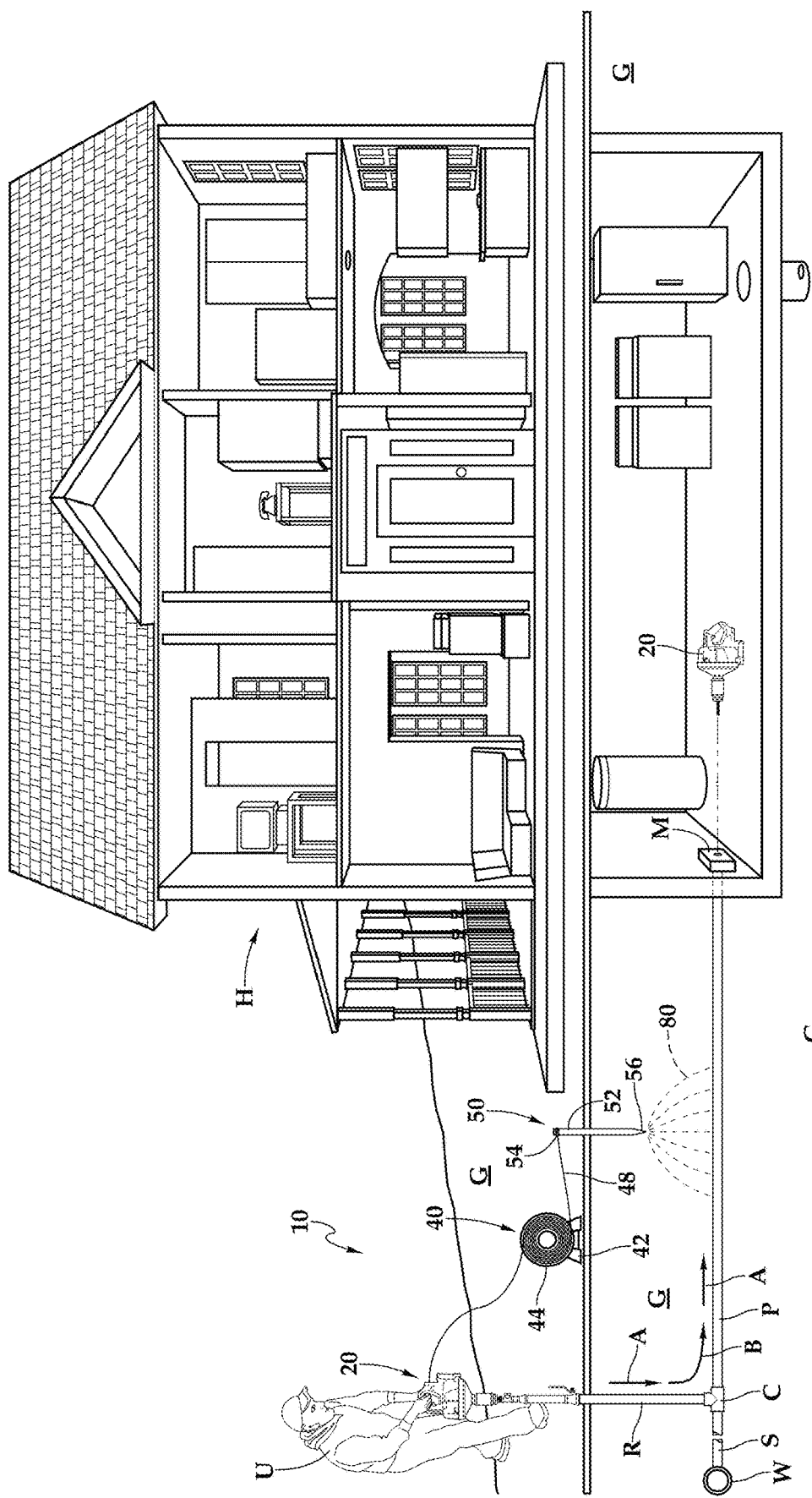
FIG. 1 is a front elevation view of a segment of pipe servicing a house, and with the system of this invention in use for scanning a service line leading to the house for determination of whether lead is associated with the pipes providing the service line.

Referring to the drawings, wherein like reference numerals represent like parts throughout the various drawing figures, reference numeral 10 is directed to a system for detection of lead in underground pipes (FIG. 1). The system 10 creates an electric circuit which includes a wall of the underground pipe P as at least a portion thereof, and then evaluates the electrical properties of the pipe P wall to make a determination as to what material the pipe P wall is formed of, and to inform further investigations to confirm the presence or absence of lead.

In essence, and with particular reference to FIGS. 1-3, basic details of the system 10 are described, according to an example embodiment. A snake 20 provides an optional portion of an electrically conductive path in this embodiment. The snake supports a probe 30 in a movable manner along an interior of a pipe P to be scanned. A spool 40 provides an optional additional portion of an electrically conductive path which leads from the snake 20 to a stake 50 which is removably attachable into ground through which the underground pipe P passes. Soil 80 within ground G between the pipe P and the ground stake 50 provides a further portion of the electric circuit. A voltage source 60 and current sensor 70 are located along the conductive path at any of a variety of locations therealong. In one embodiment, they are integrated into a housing of the snake 20. The voltage source 60 causes current to flow along the conductive path. The current sensor 70 senses an amount of current flowing along the conductive path as well as through the ground G soil 80 and pipe P wall. Data from the current sensor 70 is correlated with a position of the probe 30 along the pipe P. Analysis of this data allows for determinations to be made as to the material from which the pipe P is formed.

More specifically, and with particular reference to FIG. 2, details of an extension 2 (also called an insertion tube or pipe) are described, which allows for access into an underground pipe P to be scanned according to one embodiment of this invention. While access into a pipe P to be scanned might occur in a variety of different ways, typically underground pipes P already have access points adjacent thereto which can be utilized with the system 10 of this invention. In one embodiment, service lines S are underground pipes P for carrying water to a house H from a water main W are accessed through a curb stop C between the water main W and along the service line S. This curb stop C typically has some form of access port at a surface of the ground G. The extension 2 can be coupled to an existing riser R extending up from the curb stop C to provide for convenient access. In other embodiments, the riser R is sufficiently accessible that the extension 2 is not needed. Other access ports, such as sewer clean out ports, could alternatively be utilized for other types of fluid lines, either pressurized or unpressurized.

The extension 2 depicted herein (FIG. 2) is elongate in form and includes a coupling 4 at the lower end which provides one form of access point which can thread or otherwise attach into a corresponding junction on the riser R (FIG. 1). In this particular embodiment, the extension 2 includes a lower valve 6 which can allow for selective opening and closing of flow through the extension 2. An upper valve 7 can also be optionally provided, such as to allow water flow laterally or to be used for filling of the water line if it is partly empty. An access port 8 provides one form of entry which can be provided on an upper end of the extension 2. This access port 8 is utilized to feed the probe 30 down into the pipe P for scanning thereof, such as utilizing the snake 20 by a user U adjacent to the extension 2. In one embodiment, the extension 2 is used while the pipe P is pressurized. Some seal or defector can be provided inside the extension to allow the probe 30 to pass in and minimize water flow rate and velocity out of the port 8. Alternatively, water supply can be shut off before scanning according to this invention. As an option, the probe 30 can pass from inside of the house H, such as at a meter M or other access point, and then into the pipe P to be scanned (with or without the extension 2 being needed). In such a reverse setup (FIG. 1), the cable 25 would typically be routed through the house H, through a door or other access from the house H, and then to the spool 40 (located inside or outside) and onto the ground stake 50 located outside.

With a particular reference to FIGS. 1 and 3, details of the snake 20 are described, according to one example embodiment. While the probe 30 could merely be hand fed into the pipe P, this probe 30 advancing procedure (along arrow A of FIGS. 1 and 3) is simplified through utilization of the snake 20. The snake 20 includes a spool 26 with cable 25 supported thereon. The cable 25 extends out of the snake 20 through a collar 27 leading to a connector 35 where the cable 25 can be coupled to the probe 30.

In this embodiment, the snake 20 is contained within a housing which includes a grip 22 to allow a user U to conveniently hold the snake 20. A trigger 23 is adjacent to the grip 22. When the trigger 23 is actuated, an electric motor within the housing is caused to rotate, which in turn causes the cable spool 26 to rotate. The collar 27 can be cycled linearly away from other portions of the snake 20 and back toward other portions of the snake 20 (along arrow E of FIG. 3). This causes an amount of cable 25 to be played off of the cable spool 26 and out of the collar 27. Correspondingly, the probe 30 advances (along arrow A) within the pipe P (FIG. 1). If the pipe P has a sharp bend therein, the probe P is configured so that it can be angled to follow the pipe P (by pivoting along arrow B of FIG. 3). Rotation of the spool 26 within the housing of the snake 20 is shown along arrow D of FIG. 3. The snake 20 can include a reversing button which allows for the electric motor to be reversed and for retraction of the cable 25 back onto the spool 26 within the housing of the snake 20.

The cable 25 can include an electrically conductive pathway (such as a conductive wire surrounded by insulation carried within an interior of the cable 25). As an alternative, metal forming the cable 25 can itself form the electrical pathway, with or without insulation on an exterior of the cable 25. The spool 26 is configured so that it can maintain electrical connection between a first conductor 28 leading away from the snake 20 on an end of the cable 25 opposite the probe 30. This first conductor 28 leads away from the snake 20 and toward the ground stake 50 (typically through the spool 40).

The snake 20 preferably is powered by a battery 24. In one embodiment, this battery 24 is a rechargeable battery which can either be plugged into a source of electric power for recharging, or can be removed from the snake 20 and plugged into a recharging dock. The battery 24 also preferably provides electric power to other systems operating within the snake 20. For instance, the battery 24 can supply electric power to the voltage source 60 and the current sensor 70 (if the current sensor 70 needs a power source), if the voltage source 16 and current sensor 70 are mounted to the snake 20 or located adjacent thereto. To maintain an electrical connection between the cable spool 26 and the first conductor 28, electrically conductive slip rings can be utilized, or other connectors (e.g. brushes) can be utilized. In one embodiment, the housing also supports a display 72 to show current sensor 70 data, and also optionally a processor, and memory for data analysis. In other embodiments, a transmitter 74 transmits data to a separate device for analysis.

Figure 4:
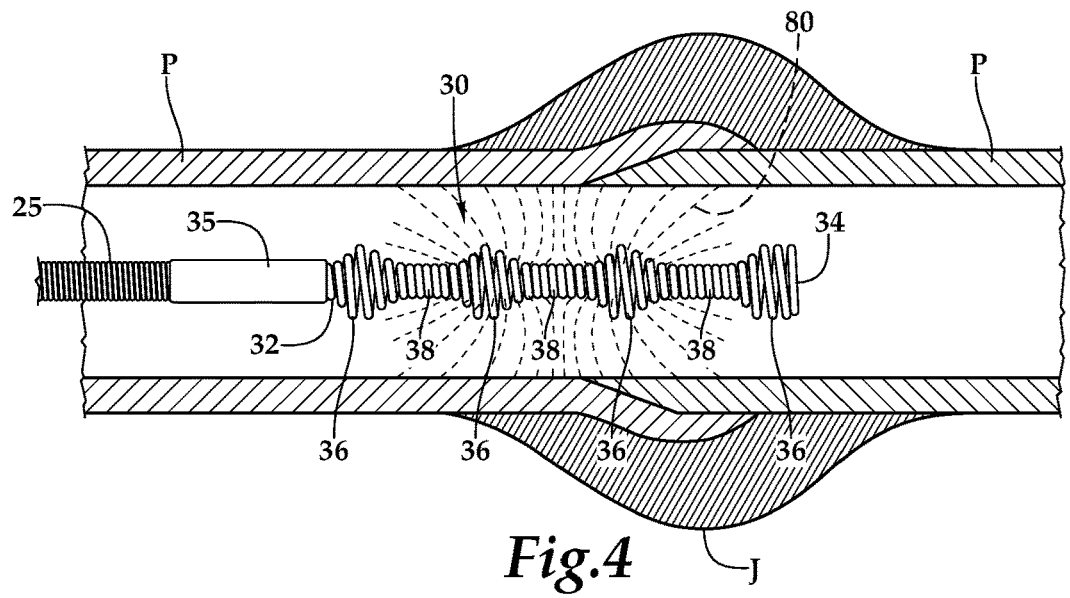
FIG. 4 is a full sectional view of a portion of the service line or other pipe with a probe of the system being fed therethrough, and illustrating how electric characteristics of the pipe are scanned according to this invention.

With particular reference to FIGS. 3 and 4, details of the probe 30 are described, according to this example embodiment. The probe 30 provides a portion of the electrically conductive path within the system 10 of this invention. This electrically conductive path can be thought of as part of a complete circuit which allows current to pass from the voltage source 60 back to the voltage source 60, following the first conductor 28, and the second conductor 48, optionally provided between the spool 40 and the ground stake 50, and also with the circuit including water or other liquid within the pipe P, the wall of the pipe P, and soil 80 between the wall of the pipe P and the ground stake 50.

The probe 30 could have a variety of different configurations. In one embodiment, the probe 30 matches characteristics of the probes disclosed in U.S. Pat. Nos. 9,304,055 and 6,301,954, incorporated herein by reference in their entirety. However, in the embodiment disclosed therein, rather than having a triple electrode form, a single coiled helical wire is provided as the probe 30. A root 32 defines a first end of the probe 30 and a tip 34 defines a second end of the probe 30 opposite the root 32. The probe 30 is preferably removably attached to the cable 25 through a connector 35. Such a removable connection allows for replacement of the probe 30 with another probe should the first probe 30 become contaminated or damaged, or to accommodate different pipe P sizes (typically 0.5 inch to 3.0 inch in diameter).

Most preferably, the helical wire forming the probe 30 includes alternating loose helical sections 36 and tight helical sections 38. The loose helical sections 36 are somewhat more bendable than the tight helical sections 38, to facilitate tight bends B (FIG. 3) in the probe 30, which allows the probe 30 to be fed along tight bends such as 90° bends within small pipes, such as pipes as small as a half inch in diameter. Furthermore, this geometry helps to ensure intimate contact with walls of the pipe. Such contact can include scraping contact. In one embodiment, when the system 10 of this invention indicates that lead might be present within walls of the pipe P, material scraped by the probe 30, and especially the loose helical sections 36, can be sampled with a test strip which can then be utilized within a lead testing kit to determine if lead is present on the probe 30. If lead is present, the system of this invention can help to determine which portion of a pathway that the probe 30 passed along is most likely the portion containing lead therein. Alternatively, an entire segment of the pipe can be removed. The probe 30 can then be removed for thorough cleaning and/or a new probe which has not come into contact with lead can be replaced through the connector 35. Alternatively, the probe 30 can be thoroughly cleaned in place until it does not return a positive reading for lead anymore.

The first conductor 28 of the snake 20 leads toward the ground stake 50, typically through a spool 40. The spool 40 is optionally provided to allow for management of the first conductor 28, especially when it has some distance away from the ground stake 50. The spool 40 includes a base 42 with a hub 44 rotatably supported upon the base 42 and with the first connector 28 rotatably supported upon the spool 40 about this hub 44. A second conductor 48 extends from the hub 44 to the ground stake 50. This connection to the second conductor 48 can be in the form of slip rings, brushes or other connection which maintains a secure electrical connection between the first conductor 28 on one side of the spool 40 and the second conductor 48 on the other side of the spool 40. As an alternative to the spool 40, sections of electrically conductive wire, such as similar to an extension cord, can merely be plugged together between the snake 20 and the stake 50.

The stake 50 is preferably an elongate spike with an upper end 52 opposite a point 56. A coupling 54 near the upper end 52 has the second conductor 48 coupled thereto, either permanently or through a removable attachment. The stake 50 is inserted into the ground. Typically a location within the ground G is selected which is relatively close to the underground pipe P to be scanned.

The ground G can have a variety of different conductivities, affecting a resistively of a soil 80 "electric circuit" portion between the pipe P and the ground stake 50. Typically the soil 80 conductivity is less than a conductivity of the pipe P, although if the pipe is formed of plastic, concrete or clay, the conductivity may be similar to that of soil, depending on the characteristics of the soil (moisture content, soil type, etc.). Generally speaking, a voltage of the voltage source 60 generates a current which passes along a path through the soil 80. The longer this path is, the greater the percentage of the voltage drop occurs through the soil 80. As one example, if 99% of the voltage drop occurs in the soil 80, only one percent of the voltage drop is occurring along either the first conductor 28, second conductor 48, cable 25, probe 30, water in the pipe P and wall of the pipe P. Current measurements will be correspondingly low. It can thus be more difficult to determine the difference between current changes associated with small variations in the soil 80 forming a portion of the conductive path and other variations such as those associated with the wall of the pipe P.

By placing the ground stake 50 relatively close to the underground pipe P being scanned, the length of the conductive path through the soil 80 is reduced, so that a relatively lesser amount of the voltage drop within the overall "circuit" occurs through the soil 80. In one typical example, a service line S between a water main W and a house H is being evaluated. A curb stop C along this service line S is at a known location. Furthermore, a meter box M adjacent to or within the house H is in another known location. Generally, the ground stake 50 can be placed at a midpoint between the curb stop C (or other access point) and the meter box M (or other end point). This will generally minimize a "length" of soil 80 along which current driven by the voltage source 60 must pass, and generally increasing readings of the current sensor 70 and enhancing meaningfulness of the acquired data.

The voltage source 60 can be located at any location along this conductive pathway between the probe 30 and the ground stake 50. In one embodiment, the voltage source 60 is located along the first conductor 28. In a second embodiment, the voltage source 60 can be mounted to a housing of the snake 20. In a third embodiment, the voltage source 60 can be associated with the spool 40. In a fourth embodiment, the voltage source 60 can be associated with the ground stake 50. The voltage source 60 could have any of a variety of different voltages. Furthermore, the voltage source could be a DC voltage source or an AC voltage source. Typically a DC voltage source is utilized and the circuit formed by the system 10 of this invention is a DC circuit. However, and especially for longer circuits, at least portions of the circuit could be AC in nature to minimize power required or for other benefits. Transformers and/or inverters can convert from AC to DC and vice versa if the circuit is hybrid in nature.

The current sensor 70 could be adjacent to voltage source 60 or elsewhere on the conductive path. In one embodiment, the current sensor 70 is mounted to the housing of the snake 20. In a second embodiment, the current sensor 70 is along the first conductor 28 between the snake 20 and the stake 50. In the third embodiment, the current sensor 70 is incorporated into the spool 40. In a fourth embodiment, the current sensor is integrated into the ground stake 50. Any of a variety of different types of current sensors 70 can be utilized.

Current sensor 70 can output data to a display 72 and/or can route data to a transmitter 74. The data from the current sensor 70 can be processed, such as with a processor. The first step in such processing typically involves correlating current sensor 70 readings with position along the pipe P. Such correlation with position can occur by keeping track of time and advancing the probe 30 at a fixed rate along the pipe P. However, most preferably the snake 20 is configured to keep track of an amount of cable 25 which has been fed into extension 2 or otherwise into the pipe P being scanned. This distance/position information is gathered and correlated with readings from the current sensor 70 so that a series of data sets are provided with each data set having two elements including a current sensor 70 reading and a distance/position reading.

Figure 5:
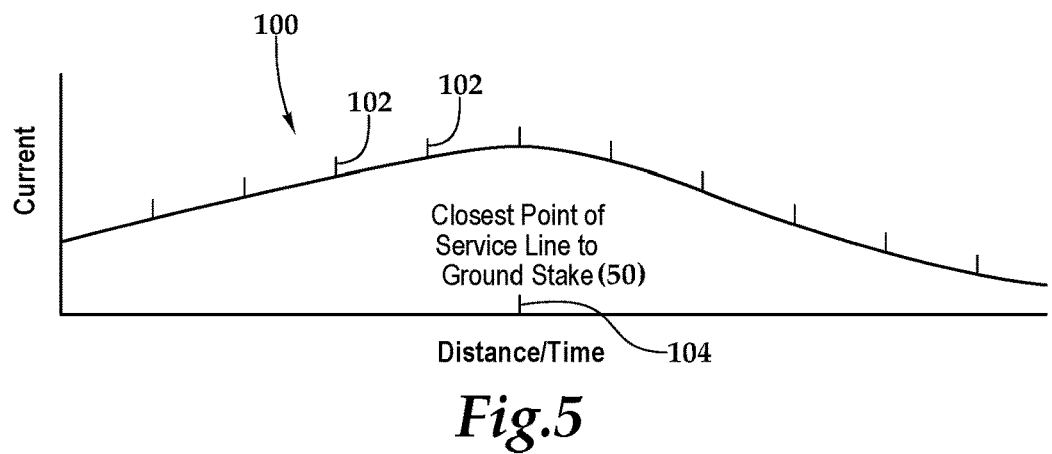
FIG. 5 is a graph generally depicting sensed current versus distance (or time) gathered by the system of this invention, and before any normalization.
Figure 6:
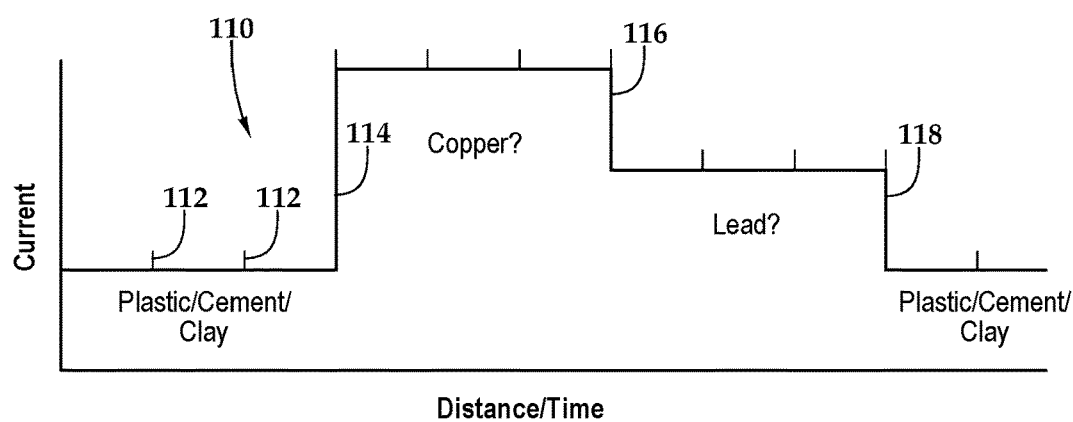
FIG. 6 is a graph which has been normalized to account for distance of portions of the pipe away from a ground stake of the system, and illustrating how different materials from which the pipe is formed return different current values when the probe is passing therethrough.
Figures 7, 8:
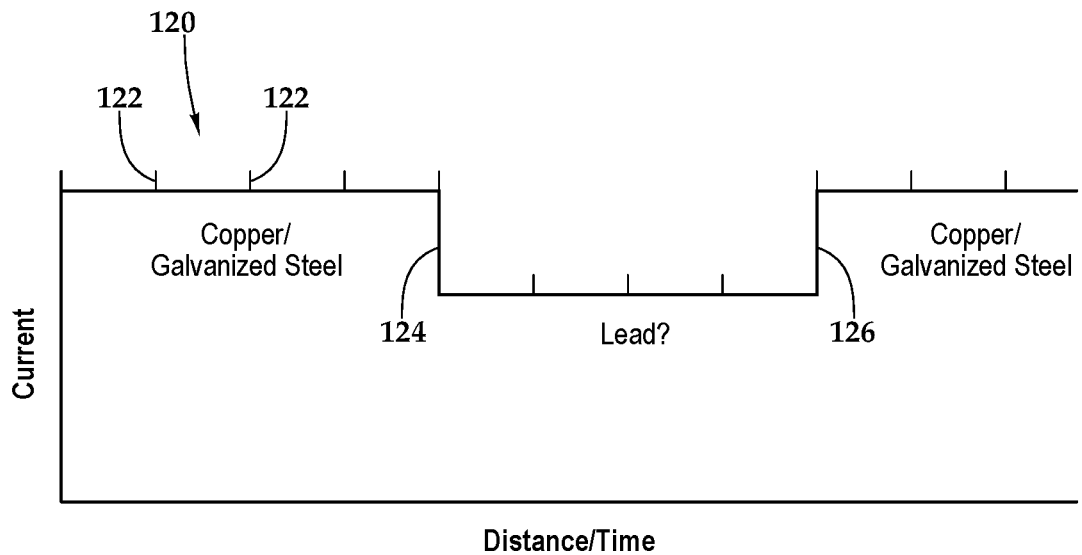
FIG. 7 is a graph similar to that which is shown in FIG. 6, but for a second service line having distinct characteristics relative to a first service line depicted in FIG. 6.
FIG. 8 is a table of representative electrical properties of various different materials.

Output from the system 10 can include this data set with multiple data points taken at different distances along the pipe P so that a two-dimensional graph of the output from the current sensor 70 can be provided (see FIGS. 5-7). If desired, a user U can first measure how deep the pipe P is underground. This distance can then be subtracted from an overall length of pipe being analyzed, or the length of pipe being analyzed can include both vertical riser R portions of the pipe P as well as horizontal service line S portions of the pipe P.

In one embodiment, distance information can be verified by taking into account when the current sensor 70 outputs a maximum current value, which may represent a closest point the service line S passes to the ground stake 50 (104 in FIG. 5). As a further option, the cable 25 can be first played off of the snake 20 all the way to an endpoint, such as adjacent to the meter box M of the service line S, and then the probe 30 can be slowly returned back through the pipe P during a data gathering pass through the pipe P.

Readings can be taken as often as desired. Distance information can also be verified by looking for spikes in the current data which can be representative of joints in the pipe P. Because joints tend to have thicker walls and with the walls typically formed of electrically conductive material, a greater amount of current will be detected when the probe 30 is adjacent to such a joint J (FIG. 4). When these joints J occur at regular intervals corresponding with standardized lengths of pipe P, such regular spikes can further be utilized to calibrate distance along the pipe P.

Once the data has been gathered from the current sensor 70, it can then be transmitted, such as with the transmitter 74, to a separate device for processing or can be processed with an onboard processor (such as supported by the housing of the snake 20). In one embodiment, the transmitter 74 utilizes a Bluetooth protocol and transmits the data to a smart phone or tablet or other wireless or wired computing device.

In addition to adjusting the data to ensure that distance data is accurate within the data set, the data set can also be normalized such as to subtract out non-linearity in the data due to distance of the probe 30 away from the ground stake 50. For instance, when the probe 30 is closest to the ground stake 50 a greatest amount of current will typically be detected by the current sensor 70. However, this increase in readings by the current sensor 70 do not correlate in any way with material from which the pipe is formed. Rather, it merely reports closeness of the pipe P to the ground stake 50.

In one embodiment a calibration test is first conducted which involves placing a pipe P of known material being tested with the system 10 of this invention. With the pipe P formed of only one material, the only impact on current sensor 70 readings will be distance of the pipe P away from the ground stake 50. Spikes 102 in the data may appear at regular intervals within the graph 100 (FIG. 5) depicting where joints are located within the pipe P. A point of highest current sensor 70 data 104 represents a point within the pipe P which is closest to the ground stake 50. This calibration data can then be essentially subtracted from raw current sensor 70 output data to produce normalized graphs such as graph 110 (FIG. 6) and graph 120 (FIG. 7). Such normalized graphs have had subtracted therefrom the affect of distance of portions of the pipe P away from the ground stake 50 and have to some extent an effect similar to if the ground stake 50 were moved along with the probe 30 to maintain a shortest distance between the ground stake 50 and the probe 30.

Graphs 110, 120 (FIGS. 6 and 7) can either be evaluated visually or can merely be analyzed by a processor to determine if the presence of a lead pipe P is indicated. With reference to graph 110 (FIG. 6) short duration spikes in the current sensor 70 data represented by spikes 112 within the graph 110 can be indicative of joints in the pipe P where a greater amount of electrically conductive material such as that associated with a coupling or a soldering joint, or accumulation of a greater amount of electrical conductive liquid within the pipe, is indicative of such a joint J (FIG. 4).

The graph of current sensor 70 data also typically includes abrupt transitions such an abrupt transition 114 where the sensed current abruptly transitions to a higher level and maintains the higher level. An abrupt transition upward is a clue that the pipe P has transitioned from a pipe P segment formed of a lower electrical conductivity material to a pipe P segment formed of higher electrical conductivity material. Similarly, an abrupt transition downward which has been maintained for some time generally indicates a transition from a pipe P segment having a greater conductivity to a pipe P segment having a lesser conductivity.

In one embodiment, lead is indicated when current from the current sensor 70 indicates a pipe P segment having a conductivity which is intermediate in value, neither being as high in conductivity as copper nor as low in conductivity as plastic, cement or clay. In one embodiment, at least one pipe P segment is formed of a known material. If the known material has a conductivity lower than lead, and a transition to a pipe segment with a higher conductivity occurs, the higher conductivity pipe P segment can then be evaluated. Through experience, a magnitude of the transition can be correlated with conductivities of types of different materials. For instance, if the sensed current increases ten times in magnitude following an abrupt transition 114 (FIG. 6) this might be more indicative of a transition from plastic to copper than plastic to lead. However, if the sensed current increases between two times and five times in magnitude following an abrupt transition, such an abrupt increase of intermediate magnitude might be more indicative of a pipe segment formed of lead.

Similarly, when a known pipe P segment is formed of copper, and an abrupt transition 116, 118 (FIG. 6) in a downward direction is sensed, this might be indicative of a lead pipe segment or a plastic pipe segment. Again, a magnitude of reduction in current could be evaluated to inform as to the material from which the pipe P segment beyond the transition is formed. If the magnitude of decreasing current is large (e.g. down to $1/10$ or less of a previous reading), this can be indicative of a transition to plastic. However, if a more intermediate decrease in current is detected, this would be more indicative of a lead pipe segment.

In other examples, multiple different pipe segments might be encountered formed of multiple different materials. If pipe segments of three distinct conductivities are detected, pipe segments having an intermediate conductivity value would be indicative of the pipe P segment being formed of lead. While pipe P segments of the highest conductivity would be inferred to be formed of copper and pipe P segments of the lowest conductivity would be inferred as being formed of plastic, cement or clay. In a further example, FIG. 7, a graph 120 is shown which has regular spikes in current 122 indicative of joints in the pipe. Abrupt transitions 124 and 126 indicate transitions between pipe P segments formed of different materials. If two pipe segments of known material have conductivities above and below conductivity of lead (e.g. copper and plastic), any pipe P segment with an intermediate current reading between the current readings for the copper pipe P and the plastic pipe P would indicate presence of a lead pipe P.

According to one method of this invention, every transition which presents the possibility of lead being present can be physically tested for the presence of lead. For instance, the probe 30 can be advanced until just short of a transition into a pipe P segment which might include lead, and then retracted and the probe 30 surfaces wiped with a lead test strip. The probe 30 can then be again advanced and this time past the transition into the section of pipe suspected to be formed of lead. It can then be retracted and surfaces of the probe 30 wiped with a test strip and tested for lead. Such a process can be repeated past multiple different abrupt transitions. Results of the physical testing of the test strips as to whether or not they contain lead can confirm what was suspected. If any lead is detected, remediation can be confidently performed on just the lead pipe segments.

With particular reference to FIG. 8, a table 130 is provided which includes resistivity and conductivity values for various different materials. It can be seen from this table that lead has a relatively unique resistivity and conductivity, with the closest material in resistivity being "tin." at a value of only slightly more than half the resistively of lead. Through extensive use of the system 10 of this invention and study of data output by the system 10, one can gain familiarity with the types of current versus distance graphs which are generated, especially for the particular soil types encountered in different municipalities and locations where the system 10 is implemented. Furthermore, factors such as time of year and amount of rainfall can also be well understood over time and subtracted out of the data so that keen insights as to the nature of the pipe P being scanned can be determined. In some cases, such current data can be conclusively determined to indicate a segment of likely lead pipe. In other instances, a probability that a lead pipe segment has been encountered is returned, sufficient to warrant further testing, either by testing a surface of the probe 30 or making test holes to directly test a segment of pipe P suspected of containing lead.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A method for detecting lead in an underground pipe that is supplying water to a house, including the steps of:
   passing a probe through the pipe that is supplying water to the house, the probe defining one end of a conductive path having a second end coupled to a ground stake, and with a voltage source and a current sensor along the conductive path;
   locating the ground stake penetrating a surface of ground in which the pipe is buried; and
   analyzing current data from said current sensor to determine if lead is indicated as being present in the pipe.

2. The method of claim 1 wherein said analyzing step includes comparing current data from a first pipe segment of the underground pipe with current data from a second pipe segment of the underground pipe, the first pipe segment formed of a known material and the second pipe segment formed of an unknown material.

3. The method of claim 2 wherein said analyzing step includes lead being indicated as being present in the second pipe segment when the first pipe segment is less electrically conductive than lead and conductivity of the second pipe segment is measured by said analyzing step to be more than conductivity of the first pipe segment.

4. The method of claim 2 wherein said analyzing step includes lead being indicated as being present in the second pipe segment when the first pipe segment is more electrically conductive than lead and conductivity of the second pipe segment is measured by said analyzing step to be less than conductivity of the first pipe segment.

5. The method of claim 4 wherein said analyzing step includes a third pipe segment formed of a known material, with said first pipe segment being more electrically conductive than lead and said third pipe segment being less electrically conductive than lead, and with the second pipe segment indicated as including lead therein when the second pipe segment has an electrical conductivity determined from the current sensor which is between electrical conductivity of the first pipe segment and electrical conductivity of the third pipe segment.

6. The method of claim 2 wherein said analyzing step includes normalizing data from the current sensor for distance of the probe away from the ground stake.

7. The method of claim 1 including the further step of determining a distance that the probe has extended along the underground pipe and correlating current data from the current sensor with position of the probe along the underground pipe.

8. The method of claim 7 wherein said determining step includes the probe located on an end of a cable rotatably supported upon a cable spool of a snake, and with an amount of cable passed out of the snake measured to determine position of the probe along the underground pipe.

9. The method of claim 1 including the further step of wirelessly transmitting current data from the current sensor to a handheld electronic device including a processor, a memory and software for performing at least a portion of said analyzing step.

10. The method of claim 1 including the further steps of:
    removing the probe from the underground pipe; and
    sampling a surface of the probe for presence of lead thereon.

11. The method of claim 1 wherein said passing step includes connecting an insertion tube to the underground pipe at an access point thereon, the insertion tube having an entry on an end thereof located above ground; and
    routing the probe into the entry, down the insertion tube and toward the underground pipe.

12. The method of claim 3 wherein the first pipe segment is made of plastic.

13. The method of claim 3 wherein the first pipe segment is made of cement.

14. The method of claim 3 wherein the first pipe segment is made of clay.

15. The method of claim 4 wherein the first pipe segment is made of copper.

* * * * *